(12) United States Patent
Okada

(10) Patent No.: US 7,971,912 B2
(45) Date of Patent: Jul. 5, 2011

(54) QUICK CONNECTOR

(75) Inventor: Hiroyuki Okada, Saitama (JP)

(73) Assignee: Sanoh Kogyo Kabushiki Kaisha, Tokyo (JP)

( * ) Notice: Subject to any disclaimer, the term of this patent is extended or adjusted under 35 U.S.C. 154(b) by 682 days.

(21) Appl. No.: 11/794,566

(22) PCT Filed: Apr. 5, 2006

(86) PCT No.: PCT/JP2006/007207
§ 371 (c)(1),
(2), (4) Date: Jun. 29, 2007

(87) PCT Pub. No.: WO2006/109643
PCT Pub. Date: Oct. 19, 2006

(65) Prior Publication Data
US 2010/0001518 A1    Jan. 7, 2010

(30) Foreign Application Priority Data
Apr. 7, 2005    (JP) .................................. 2005-110957

(51) Int. Cl.
*F16L 39/00* (2006.01)
(52) U.S. Cl. ........................................ 285/319; 285/351
(58) Field of Classification Search ................... 285/319, 285/351, 352, 14
See application file for complete search history.

(56) References Cited

U.S. PATENT DOCUMENTS

| | | | |
|---|---|---|---|
| 1,996,779 A * | 4/1935 | Wheeler | 277/513 |
| 2,210,826 A * | 8/1940 | Williams | 277/512 |
| 2,511,495 A * | 6/1950 | Crot | 285/119 |
| 2,724,602 A * | 11/1955 | Carey et al. | 285/123.12 |
| 3,967,841 A * | 7/1976 | Kendrick et al. | 285/276 |
| 3,967,842 A * | 7/1976 | Kendrick | 285/276 |
| 4,187,846 A * | 2/1980 | Lolachi et al. | 604/411 |
| 4,619,473 A * | 10/1986 | Someya | 285/353 |
| 4,817,995 A * | 4/1989 | Deubler et al. | 285/98 |
| 4,846,506 A * | 7/1989 | Bocson et al. | 285/4 |
| 4,895,396 A * | 1/1990 | Washizu | 285/93 |
| 4,923,228 A * | 5/1990 | Laipply | 285/319 |
| 4,946,205 A * | 8/1990 | Washizu | 285/319 |
| 5,052,720 A * | 10/1991 | Yoda | 285/14 |

(Continued)

FOREIGN PATENT DOCUMENTS

JP    11-082820    3/1999

(Continued)

OTHER PUBLICATIONS

Patent Abstracts of Japan computer English abstract of JP 11-351481 dated Dec. 24, 1999.

(Continued)

*Primary Examiner* — Aaron Dunwoody
(74) *Attorney, Agent, or Firm* — Ladas & Parry LLP

(57) ABSTRACT

A quick connector with sealing capacity for preventing the leakage and penetration of fuel and the entrance of foreign matters, such as mud, and water past a retainer. The quick connector includes a housing (12) internally provided with first sealing rings (29) and (30) for sealing a gap between the metallic surface of an uncoated end part of a tube (16) and the inside surface of the housing (12), and second sealing rings (33) and (34) for sealing a gap between the surface of a coated part of the tube (16) and the inside surface of the housing (12).

10 Claims, 2 Drawing Sheets

U.S. PATENT DOCUMENTS

| | | | | |
|---|---|---|---|---|
| 5,098,136 | A * | 3/1992 | Washizu | 285/319 |
| 5,324,082 | A * | 6/1994 | McNaughton et al. | 285/93 |
| 5,338,073 | A * | 8/1994 | Washizu et al. | 285/319 |
| 5,354,106 | A * | 10/1994 | Washizu et al. | 285/319 |
| 5,441,313 | A * | 8/1995 | Kalahasthy | 285/93 |
| 5,456,500 | A * | 10/1995 | Klinger et al. | 285/93 |
| 5,472,016 | A * | 12/1995 | Szabo | 138/89 |
| 5,542,717 | A * | 8/1996 | Rea et al. | 285/319 |
| 5,609,370 | A * | 3/1997 | Szabo et al. | 285/319 |
| 5,676,403 | A * | 10/1997 | Klinger et al. | 285/93 |
| 5,785,358 | A * | 7/1998 | Kujawski et al. | 285/93 |
| 5,882,048 | A * | 3/1999 | Kawasaki et al. | 285/319 |
| 5,893,590 | A * | 4/1999 | Klinger et al. | 285/319 |
| 5,931,509 | A * | 8/1999 | Bartholomew | 285/93 |
| 6,129,393 | A * | 10/2000 | Kodama et al. | 285/319 |
| 6,179,341 | B1 * | 1/2001 | Ketcham et al. | 285/148.23 |
| 6,186,561 | B1 * | 2/2001 | Kaishio et al. | 285/319 |
| 6,199,916 | B1 * | 3/2001 | Klinger et al. | 285/288.1 |
| 6,250,692 | B1 * | 6/2001 | Ito et al. | 285/319 |
| 6,349,977 | B1 * | 2/2002 | Ketcham et al. | 285/319 |
| 6,382,680 | B1 * | 5/2002 | Horimoto | 285/81 |
| 6,412,830 | B1 * | 7/2002 | Akiyama et al. | 285/319 |
| 6,634,679 | B1 * | 10/2003 | Stieler | 285/308 |
| 6,755,675 | B2 * | 6/2004 | Szabo et al. | 439/191 |
| 6,857,663 | B2 * | 2/2005 | Nagata et al. | 285/81 |
| 7,108,297 | B2 * | 9/2006 | Takayanagi et al. | 285/319 |
| 7,344,166 | B2 * | 3/2008 | Ketcham et al. | 285/319 |
| 7,401,818 | B2 * | 7/2008 | Takayanagi | 285/319 |
| 7,407,165 | B1 * | 8/2008 | Chisnell | 277/603 |
| 7,467,813 | B2 * | 12/2008 | Gunderson | 285/319 |
| 7,488,005 | B2 * | 2/2009 | Gunderson | 285/319 |
| 2002/0145285 | A1 * | 10/2002 | Katayama et al. | 285/423 |

FOREIGN PATENT DOCUMENTS

| | | |
|---|---|---|
| JP | 11-351481 | 12/1999 |
| JP | 2002-276878 | 9/2002 |
| JP | 2003-294184 A | 10/2003 |

OTHER PUBLICATIONS

Patent Abstracts of Japan computer English abstract of JP 11-082820 dated Mar. 26, 1999.

Patent Abstracts of Japan computer English abstract of JP 2002-276878 dated Sep. 25, 2002.

Japanese Office Action Issued on Oct. 8, 2010 With English Translation.

* cited by examiner

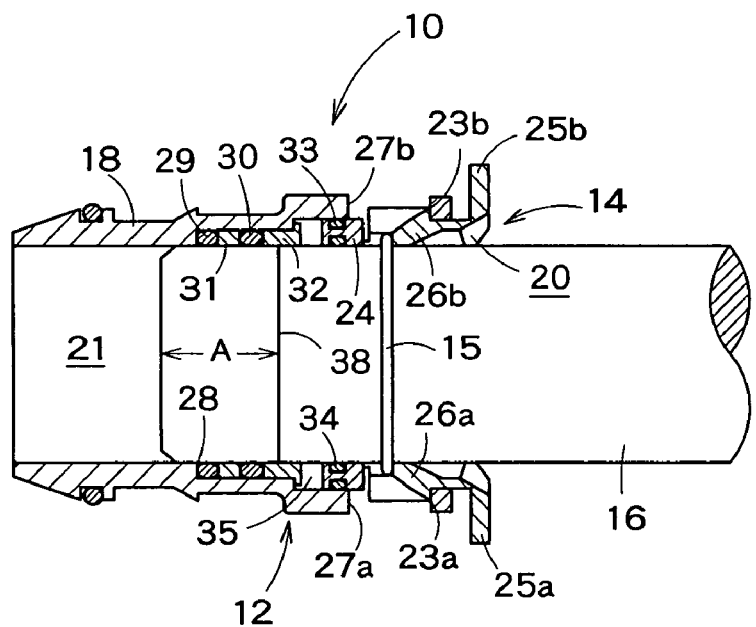
F I G. 1
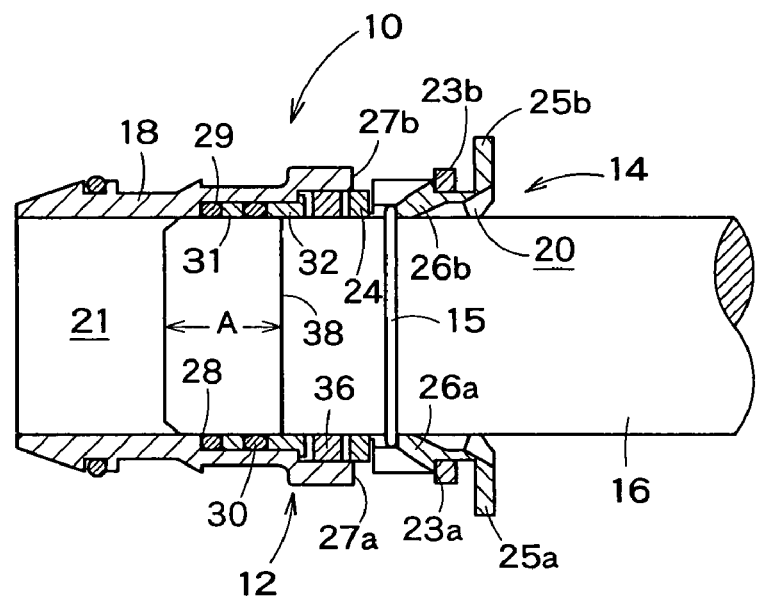
F I G. 2

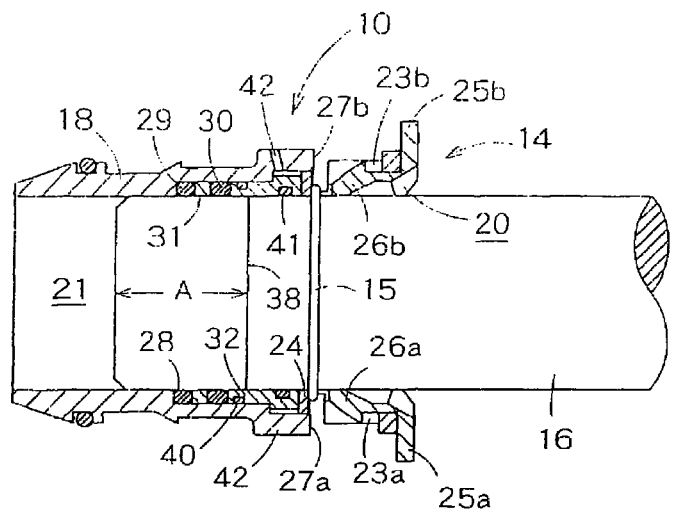
F I G. 3

QUICK CONNECTOR

TECHNICAL FIELD

The present invention relates to a quick connector for connecting tubes of a fuel supply line on an automobile or the like and, more particularly, to a quick connector having an improved sealing function.

BACKGROUND ART

Quick connectors are used widely for connecting tubes serving as automotive fuel lines.

Referring to FIG. 4 showing a representative, known quick connector, the quick connector includes a housing 4 having a connecting part 3 provided with a plurality of annular ridges. The connecting part 3 is forced into a resin tube. A tube 2 to be connected to another tube by the quick connector has an end part provided with an annular ridge 2a on its outer surface.

A retainer 5 retains the tube 2 in a housing 4. The retainer 5 is inserted in the housing 4 through a pipe inlet of the housing 4. When the tube 2 is inserted into the housing 4 after inserting the retainer 5 into the housing 4, end edges of tongues 6 engage with the annular ridge 2a to restrain the tube 2 from falling off the housing 4. The quick connector can easily connect the tubes without using any fasteners, such as bolts.

A quick connector of this type to be used in an automotive fuel supply system is required to have a particularly reliable sealing capacity capable of surely preventing the leakage of the fuel from the quick connector. Recently, sever environmental regulations have been enforced to place restrictions on the diffusion of the fuel leaked through connectors into the atmosphere.

A quick connector similar to the quick connector shown in FIG. 4 and proposed in, for example, JP 2003-287180 A has enhanced sealing construction.

In this previously proposed quick connector, a housing is provided with an annular protrusion at a position corresponding to that of a spacer 8 of the quick connector shown in FIG. 4, sealing member holding spaces are formed on the opposite sides of the annular protrusion, respectively, and annular sealing members respectively having different sealing abilities are placed in the sealing member holding spaces, respectively.

Patent document 1: JP 2003-287180 A

DISCLOSURE OF THE INVENTION

Problem to be Solved by the Invention

A high sealing capacity is essential to a quick connector to prevent the leakage and permeation of fuel.

In the quick connector shown in FIG. 4, openings are formed in parts corresponding to the tongues 6 of the retainer 5 of the housing. Mud and such are likely to enter the quick connector through the openings.

A sealing structure formed in the housing 4 of the quick connector includes annular sealing members 7a and 7b, such as O rings. The spacer 8 is interposed between the annular sealing members 7a and 7b. The annular sealing members 7a and 7b and the spacer 8 are held in place by a top hat 9. The surface of the tube 2 is coated with a rustproof film by plating or the like. An end part indicated at A in FIG. 4 of the tube 2 is not coated intentionally with the rustproof film and the metallic surface thereof is exposed. Since the annular sealing members 7a and 7b are in direct contact with the metallic surface of the end part A, the annular sealing members 7a and 7b can exercise high sealing performance and high fuel leakage preventing effect.

The top hat 9 does not have a sealing function effective in preventing the entrance of mud and water into the quick connector. Mud and water can easily enter the quick connecter to the annular sealing member 7b. Although the annular sealing member 7b prevents the further leakage of mud and water into the quick connector, the exposed metallic surface of the end part A of the tube can be progressively corroded by mud and water.

Accordingly, it is an object of the present invention to solve those problems in the related art and to provide a quick connector capable of surely preventing the entrance of foreign matters, such as mud, and water and of surely preventing the deterioration of the sealing performance of sealing members resulting from corrosion caused by mud and water.

Means for Solving the Problem

The present invention provides a quick connector including: a housing into which an end part provided with an annular ridge of a tube is inserted; and a retainer axially inserted into the housing so as to engage with the annular ridge of the end part of the tube to hold the tube connected to the housing; wherein the housing is internally provided with first sealing means for sealing a gap between the metallic surface of an uncoated end part of the tube and the inside surface of the housing, and second sealing means for sealing a gap between the surface of a coated part of the tube and the inside surface of the housing.

According to the present invention, the second sealing means may be combined with an annular part of the retainer. Preferably, the second sealing means includes O rings put on the outside surface and the inside surface, respectively, of the annular part.

According to the present invention, the second sealing means may be formed on the outside and/or the inside surface of a top hat holding the first sealing means in place in the housing.

According to the present invention, the second sealing means can be formed by placing an annular sealing member between the top hat holding the first sealing means in place and the retainer.

According to the present invention, the second sealing means can surely prevent the entrance of external foreign matters, such as mud, and water into space on the inner side of the retainer. Therefore, the corrosion of the metallic surface of the uncoated part not coated with any film to ensure satisfactory sealing with mud and water can be surely prevented, and the sealing capacity of the first sealing means can be maintained for a long time.

BRIEF DESCRIPTION OF THE DRAWINGS

FIG. 1 is a longitudinal sectional view of a quick connector in a first embodiment according to the present invention;

FIG. 2 is a longitudinal sectional view of a quick connector in a second embodiment according to the present invention;

FIG. 3 is a longitudinal sectional view of a quick connector in a third embodiment according to the present invention.

BEST MODE FOR CARRYING OUT THE INVENTION

Figure 4:
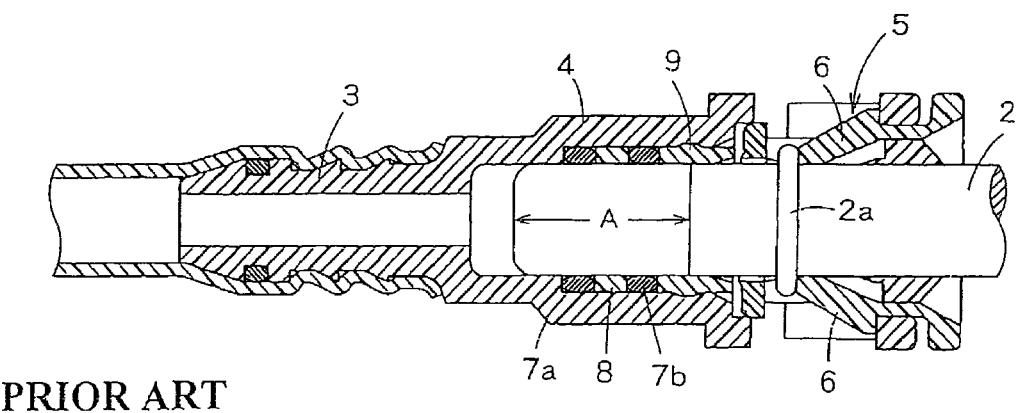
FIG. 4 is a longitudinal sectional view of a known quick connector.

Quick connectors in preferred embodiments according to the present invention will be described with reference to the accompanying drawings.

First Embodiment

Referring to FIG. 1, a quick connector 10 in a first embodiment according to the present invention includes a housing 12 and a retainer 14. A tube 16 is made of a metal or a resin. An annular ridge 15 is formed in the tube 16 in a part at a predetermined distance from the tip of the tube 16.

The housing 12 of the quick connector 10 is a female joint having an inlet opening 20 through which the tube 16 is inserted into the housing 12. A connecting part 18 provided with annular ridges is formed integrally with the housing 12. The connecting part 18 is forced into a resin tube, not shown.

The retainer 14 is a tubular member of a plastic material. The retainer 14 has an annular part 24 of an inside diameter substantially equal to the outside diameter of the tube 16, and side parts 25a and 25b. This quick connector 10 is characterized by forming a sealing means in the annular part of the retainer 14. The side parts 25a and 25b of the retainer 14 are the same as those of a known retainer of this type. The side parts 25a and 25b can be warped radially outward and inward. Locking tongues 26a and 26b capable of engaging with the annular ridge 15 of the tube 16 are formed integrally with the side parts 25a and 25b, respectively. The locking tongues 26a and 26b are provided in their outside surfaces with shoulders 23a and 23b, respectively.

The housing 12 is provided in its side wall with openings 27a and 27b at positions respectively corresponding to the tongues 26a and 26b. When the retainer 14 is inserted through the inlet opening 20 into the housing 12, the shoulders 23a and 23b of the locking tongues 26a and 26b detachably engage the axially outer edges of the openings 27a and 27b, respectively, to prevent the retainer 14 from coming off the housing 12.

Basically, the tube 16 is pressed through the retainer 14 mounted on the housing 12 into the housing 12. The locking tongues 26a and 26b of the retainer 14 engage with the annular ridge 15 of the tube 16 to restrain the tube 16 from coming off the quick connector 10. Thus the tube 16 can be connected to the housing 12 by a single connecting action.

As shown in FIG. 1, an axial bore 21 is formed in the housing 12 so as to extend through the connecting part 18. The housing 12 has an expanded part having an inside surface terminating at a shoulder 28. Two O rings 29 and 30 forming the first sealing means are fitted in the expanded part of the housing 12. the O rings 29 and 30 are separated by a spacer 31. The O rings 29 and 30 are held in place in the expanded part of the housing 12 by a top hat 32 contiguous with the O ring 30.

The metallic surface of an end part of the tube 16 extending between the tip of the tube 16 and a position on the tube 16 at a distance A from the tip is exposed to enhance the sealing effect of the O rings 29 and 30 forming the first sealing means. The O rings 29 and 30 are in direct contact with the exposed metallic surface of the end part of the tube 16. the surface of the tube 16 excluding that of the end part of the same is coated with a resin film or a plated film to protect the tube 16 from corrosion. As shown in FIG. 1, in a state where the tube 16 has been inserted deep into the housing 12 and has been completely engaged with the retainer 14, the top hat 32 lies on a boundary surface 38 between the metallic surface and the coated surface coated with a resin film.

The annular part 24 of the retainer 14 in this embodiment, which is different from a known retainer, has a cylindrical shape. Two O rings 33 and 34 are put on the outside and the inside surface, respectively, of the annular part 24. The O rings 33 and 34 seal a gap between the coated surface of the tube 16 and the inside surface of the housing 12. Thus the O rings 33 and 34 form second sealing means for preventing the entrance of external foreign matters into the housing 12.

The operation and effect of the quick connector 10 in the first embodiment will be described.

The metallic surface of the end part of the tube 16 is not coated with any film and is exposed intentionally. Therefore, the O rings 29 and 30 forming the first sealing means are in direct contact with the metallic surface of the end part. Thus the O rings 29 and 30 can exercise satisfactory sealing performance and can highly effectively prevent the leakage of the fuel from the quick connector 10.

The quick connector 10 in the first embodiment including the retainer 14 is provided with the openings 27a and 27b formed in the side wall of the housing 12. Therefore, foreign matters, such as mud, and water can easily enter through the openings 27a and 27b past the top hat 32 into the housing 12.

The quick connector 10 in the first embodiment is provided with the second sealing means including the O rings 33 and 34 put on the outside and the inside surface, respectively, of the annular part 24 in addition to the first sealing means. The annular part 24 is separated from top hat 32 by opening 35. The O rings 33 and 32 can intercept mud and water to prevent the entrance of mud and water into the housing 12. Consequently, the corrosion by mud and water of the metallic surface of the end part of the tube 16 intentionally exposed to enhance the sealing performance of the O rings 29 and 30 forming the first sealing means can be surely prevented, and hence the sealing effect of the O rings 29 and 30 can be maintained for a long time.

Second Embodiment

Referring to FIG. 2, a quick connector 10 in a second embodiment according to the present invention differs from the quick connector 10 in the first embodiment in that second sealing means for preventing the entrance of mud and water includes an annular sealing member 36 separated from a top hat 32 for holding O rings 29 and 30 forming first sealing means in place and a retainer 14.

The retainer 14 of the quick connector 10 in the second embodiment is different from that of the quick connector 10 in the first embodiment. The retainer 14 of the quick connector 10 in the second embodiment has an annular part 24 resembling a thin ring. The sealing member 36 serving as the second sealing means is disposed between the annular part 24 of the retainer 14 and the top hat 32.

The sealing member 36 serving as the second sealing means surely stops the entrance of mud and water via the annular part 24 of the retainer into a housing 12. Thus the corrosion by mud and water of the metallic surface of an end part of a tube 16 intentionally exposed to enhance the sealing performance of the O rings 29 and 30 forming the first sealing means can be surely prevented.

Third Embodiment

A quick connector 10 is a third embodiment according to the present invention will be described with reference to FIG. 3.

Second sealing means for preventing the entrance of water from outside included in the third embodiment includes an o ring 40 fitted in an annular groove formed in the outside surface of a top hat 32 holding O rings 29 and 30 forming first sealing means in place, and an O ring 41 fitted in an annular groove formed in the inside surface of the top hat 32.

In the third embodiment, a retainer 14 has an annular part 24 resembling a thin ring and capable of coming into contact with the top hat 32. The top hat 32 is cylindrical and has a length equal to the distance between the annular part 24 and the O ring 30. Preferably, a housing 12 is provided with drain ports 42 for draining water collected around the top hat 32.

In the third embodiment, the O rings 40 and 41 mounted on the top hat 32 can effectively prevent the entrance of mud and water from outside. Thus the corrosion by mud and water of the metallic surface of an end part of a tube 16 intentionally exposed to enhance the sealing performance of the O rings 29 and 30 forming the first sealing means can be surely prevented.

The invention claimed is:

1. A quick connector for a tube comprising a first end part that includes an uncoated portion comprising a metallic surface, a coated portion, and a ridge portion, the coated portion being disposed axially further from an end of the first end part than the uncoated portion, the quick connector comprising (a) a housing into which the uncoated portion and the coated portion of the first end part is insertable such that there is a gap between the metallic surface of the uncoated portion and an inside surface of the housing and a gap between an outside surface of the coated portion and the inside surface of the housing; (b) first sealing means for sealing the gap between the metallic surface of the uncoated portion and the inside surface of the housing when the tube is inserted in the housing: (c) a retainer comprising a portion that is axially insertable into the housing when the uncoated portion and the coated portion of the first end part is inserted in the housing to engage with the annular ridge to connect the tube to the housing, the retainer comprising an annular part at the portion that is axially insertable into the housing: and (d) second sealing means formed on the annular part of the retainer for sealing the gap between the outside surface of the coated portion and the inside surface of the housing wherein the tube is inserted in the housing.

2. The quick connector according to claim 1, wherein the second sealing means comprises O rings disposed on respective outside and inside surfaces of the annular part.

3. A kit comprising the quick connector according to claim 1 and tube comprising a first end part that includes an uncoated portion comprising a metallic surface, a coated portion and a ridge portion.

4. An apparatus comprising the quick connector according to claim 1 and a tube comprising a first end part that includes an uncoated portion comprising a metallic surface, a coated portion and a ridge portion, wherein the uncoated portion and the coated portion of the first end part is inserted in the housing with a gap between the metallic surface of the uncoated portion and the inside surface of the housing and a gap between the outside surface of the coated portion and the inside surface of the housing, and wherein the portion of the retainer is inserted into the housing and engages the annular ridge to connect the tube to the housing, the first sealing means sealing the gap between the metallic surface of the uncoated portion and the inside surface of the housing and the second sealing means sealing the gap between the outside surface of the coated portion and the inside surface of the housing.

5. A quick connector for a tube comprising a first end part that includes an uncoated portion comprising a metallic surface, a coated portion, and a ridge portion, the coated portion being disposed axially further from an end of the first end part than the uncoated portion, the quick connector comprising (a) a housing into which the uncoated portion and the coated portion of the first end part is insertable such that there is a gap between the metallic surface of the uncoated portion and an inside surface of the housing and a gap between an outside surface of the coated portion and the inside surface of the housing; (b) first sealing means for sealing the gap between the metallic surface of the uncoated portion and the inside surface of the housing when the tube is inserted in the housing; (c) a top hat for holding the first sealing means in place in the housing; (d) a retainer comprising a portion that is axially insertable into the housing when the uncoated portion and the coated portion of the first end part is inserted in the housing to engage with the annular ridge to connect the tube to the housing; and (e) second sealing means formed on respective outside and inside surfaces of the top hat. for sealing the gap between the outside surface of the coated portion and the inside surface of the housing when the tube is inserted in the housing.

6. The quick connector according to claim 5, wherein the housing comprises drain ports disposed for draining water that collects around the top hat.

7. The quick connector according to claim 5, Wherein the second sealing means comprises O rings disposed on respective outside and inside surfaces of the top hat.

8. A kit comprising the quick connector according to claim 5 and tube comprising a first end part that includes an uncoated portion comprising a metallic surface, a coated portion and a ridge portion.

9. A quick connector for a tube comprising a first end part that includes an uncoated portion comprising a metallic surface, a coated portion, and a ridge portion, the coated portion being disposed axially further from an end of the first end part than the uncoated portion, the quick connector comprising (a) a housing into which the uncoated portion and the coated portion of the first end part is insertable such that there is a gap between the metallic surface of the uncoated portion and an inside surface of the housing and a gap between an outside surface of the coated portion and the inside surface of the housing; (b) first sealing means for sealing the gap between the metallic surface of the uncoated portion and the inside surface of the housing when the tube is inserted in the housing; (c) a top hat for holding the first sealing means in place in the housing; (d) a retainer comprising a portion that is axially insertable into the housing when the uncoated portion and the coated portion of the first end part is inserted in the housing to engage with the annular ridge to connect the tube to the housing; and (e) second sealing means comprising an annular sealing member disposed between the top hat and the retainer for sealing the gap between the outside surface of the coated portion and the inside surface of the housing when the tube is inserted in the housing.

10. A kit comprising the quick connector according to claim 9 and tube comprising a first end part that includes an uncoated portion comprising a metallic surface, a coated portion and a ridge portion.

* * * * *